(12) United States Patent
Zhang (10) Patent No.: US 10,757,719 B2
(45) Date of Patent: Aug. 25, 2020

(54) MULTISCALE APPROACH TO PREDICTABLE WIRELESS NETWORKING

(71) Applicant: Wayne State University, Detroit, MI (US)

(72) Inventor: Hongwei Zhang, Ames, IA (US)

(73) Assignee: Wayne State University, Detroit, MI (US)

( * ) Notice: Subject to any disclaimer, the term of this patent is extended or adjusted under 35 U.S.C. 154(b) by 114 days.

(21) Appl. No.: 15/846,871

(22) Filed: Dec. 19, 2017

(65) Prior Publication Data

US 2018/0176933 A1 Jun. 21, 2018

Related U.S. Application Data

(60) Provisional application No. 62/436,905, filed on Dec. 20, 2016.

(51) Int. Cl.
*H04W 72/12* (2009.01)
*H04Q 9/00* (2006.01)
(Continued)

(52) U.S. Cl.
CPC ........ *H04W 72/1226* (2013.01); *G08C 17/02* (2013.01); *H04Q 9/00* (2013.01); *H04W 84/18* (2013.01)

(58) Field of Classification Search
None
See application file for complete search history.

(56) References Cited

U.S. PATENT DOCUMENTS

2010/0124207 A1* 5/2010 Ghanadan ............. H04W 74/02
370/336
2010/0284274 A1* 11/2010 Ghanadan ............... H04L 47/10
370/230.1

(Continued)

OTHER PUBLICATIONS

"Scheduling with Predictable Link Reliability for Wireless Networked Control", Zhang et al., PRKS-long.pdf, Mar. 2, 2015 (Year: 2015).*

(Continued)

*Primary Examiner* — Alex Skripnikov
*Assistant Examiner* — Sharmin Chowdhury
(74) *Attorney, Agent, or Firm* — Carlson, Gaskey & Olds, P.C.

(57) ABSTRACT

A distributed sensing and control network includes a plurality of sensing/control nodes, each of the sensing/control nodes includes a sensor, a local controller, a local memory and a wireless transmitter/receiver. The local memory stores instructions for implementing a multiscale networking protocol for wireless transmissions. The multiscale networking protocol controls at least a first factor at a first timescale and at least a second factor at a second timescale, distinct from the first timescale. The at least a first factor includes an instantiated physical-ratio-K (PRK) interference model for wireless transmissions. The at least a second factor includes at least one of a channel assignment, a node transmission signal power control, a node transmission rate control, a real-time scheduling control, and a local signal map stored in the local memory. Wherein the local signal map, together with instantiated physical-ratio-K (PRK) interference models, defines an interference relationship between a sensing/control node storing the local signal map and each other sensing/control node of the plurality of sensing/control nodes within an exclusion region of the sensing/control node storing the local signal map.

21 Claims, 5 Drawing Sheets

(51) Int. Cl.
*G08C 17/02* (2006.01)
*H04W 84/18* (2009.01)

(56) References Cited

U.S. PATENT DOCUMENTS

2013/0279540 A1* 10/2013 Hui .................. H04W 72/0406
375/133
2018/0375647 A1* 12/2018 Yan ....................... H04L 9/0833

OTHER PUBLICATIONS

"A Maximal Concurrency and Low Latency Distributed Scheduling Protocol for Wireless Sensor Networks", Zhang et al., International Journal of Distributed Sensor Networks, vol. 2015, ONAMA.pdf (Year: 2015).*
"Scheduling with Predictable Link Reliability for Wireless Networked Control", Zhang et al., IWQoS 2015, IEEE_IWQOS2015.pdf (Year: 2015).*

* cited by examiner

MULTISCALE APPROACH TO PREDICTABLE WIRELESS NETWORKING

CROSS-REFERENCE TO RELATED APPLICATION

This application claims priority to U.S. Provisional Application No. 62/436,905 filed Dec. 20, 2016 and is incorporated herein by reference.

STATEMENT OF GOVERNMENT SUPPORT

This invention was made with government support under contract 1054634 awarded by the National Science Foundation. The government has certain rights in the invention.

TECHNICAL FIELD

The present disclosure relates generally to wireless networking, and more specifically to a multiscale approach to predictable wireless networking.

BACKGROUND

Embedded wireless networks have been explored for closed-loop, real-time sensing and control. In industrial automation, for instance, wireless-enabled mobile, pervasive, and reconfigurable instrumentation and the significant cost of planning, installing, and maintaining wired network cables have made wireless networks attractive for industrial monitoring and control. Industrial wireless networking standards such as WirelessHART, ISA100.11a, and WIA-PA have been defined and deployed in practice. In road transportation, wireless communication has become a basic enabler for connected and automated vehicles, which cooperate with one another and with transportation infrastructures to ensure safety, maximize fuel economy, and minimize emission as well as congestion. Machine-type communication for real-time sensing and control has also become a major focus of emerging 5G wireless network research and development. Wireless communication is also a basic enabler for networked augmented reality, for instance, by integrating spatially distributed cameras into collaborative augmented vision systems.

In wireless networked sensing and control (WSC), communication across wireless networks is a basic enabler for coordination among distributed sensors, controllers, and actuators. The mission-critical nature of real-time WSC tasks, such as the control of industrial plants and vehicles and/or the seamless experience of augmented reality, requires predictable reliability, timeliness, and throughput in wireless communication. Nonetheless, wireless communication is subject to inherent dynamics and uncertainties within the system and environment. Wireless communication channels exhibit complex, environment-specific spatiotemporal dynamics and uncertainties. Interference between concurrent transmissions is a major source of uncertainty, and the interference cuts across multiple aspects of wireless networking such as scheduling, channel assignment, power control, rate control, and routing. Dynamic control strategies in WSC systems introduce dynamic network traffic patterns and pose different requirements on communication reliability, timeliness, and throughput; in vehicular WSC systems, vehicle mobility introduces another dimension of uncertainty and complexity.

While wireless networking has been extensively studied, existing mechanisms have not solved fundamental problems such as predictable interference control in the presence of uncertainties and predictable multi-hop real-time communication in the presence of fast-varying, probabilistic path delays. Hence we still lack mechanisms for ensuring predictable communication reliability, timeliness, and throughput. Accordingly, current research and practice adopts a centralized architecture where a network manager centrally collects statistics of the network state (e.g., wireless channel gain) and centrally decides routing paths and transmission schedules. The centralized architecture makes it difficult to ensure predictable communication reliability and timeliness in the presence of uncertainties.

Without addressing predictable control of interference among concurrent transmitters, these works have largely avoided channel spatial reuse too, leading to underutilization of network real-time capacity. The deficiencies of centralized architectures and no-channel-spatial-reuse are especially acute in large-scale WSC networks. Having not resolved fundamental challenges posed by interference and probabilistic path delays, existing distributed approaches in industrial and vehicular WSC systems cannot ensure predictable reliability and timeliness in communication.

Accordingly, the current real-world deployments of WSC systems have mostly been limited to open-loop sensing such as industrial monitoring and vehicle active-safety warning.

SUMMARY OF THE INVENTION

In one exemplary embodiment a distributed sensing and control network includes a plurality of sensing/control nodes, each of the sensing/control nodes including a sensor, a local controller, a local memory and a wireless transmitter/receiver, and wherein the local memory stores instructions for implementing a multiscale networking protocol for wireless transmissions, the multiscale networking protocol controls at least a first factor at a first timescale and at least a second factor at a second timescale, distinct from the first timescale, the at least a first factor including an instantiated physical-ratio-K (PRK) interference model for wireless transmissions, the at least a second factor including at least one of a channel assignment, a node transmission signal power control, a node transmission rate control, and a real-time scheduling control, and a local signal map stored in the local memory, wherein the local signal map, together with instantiated physical-ratio-K (PRK) interference models, defines an interference relationship between a sensing/control node storing the local signal map and each other sensing/control node of the plurality of sensing/control nodes within an exclusion region of the sensing/control node storing the local signal map.

In another example of the above described distributed sensing and control network the first timescale is longer than the second timescale.

In another example of any of the above described distributed sensing and control networks the first timescale is on the order of multiple packet transmissions.

In another example of any of the above described distributed sensing and control networks the second timescale is on the order of a single packet transmission.

In another example of any of the above described distributed sensing and control networks the local memory stores instructions for increasing a parameter K of the PRK interference model in response to a link reliability that is lower than a required link reliability.

In another example of any of the above described distributed sensing and control networks the local memory stores instructions for decreasing a parameter K of the PRK interference model in response to a link reliability that is higher than a required link reliability.

In another example of any of the above described distributed sensing and control networks the network includes a plurality of channels, and wherein each of the nodes is operable to transmit in at least some of the channels.

In another example of any of the above described distributed sensing and control networks the network is configured as one of a single hop network, a multi-hop network, and a device to device (D2D) network.

In another example of any of the above described distributed sensing and control networks the network is a multi-hop network, and wherein each node further includes instructions configured to determine a local deadline of a packet, and wherein the local deadline is derived using a link/path delay distribution.

In another example of any of the above described distributed sensing and control networks the link/path delay distribution is based on a real-time scheduling policy including the process of adjusting a K parameter of a physical-ratio-K (PRK) interference model according to a first timescale and adjusting at least one of a channel assignment, a node transmission signal power and a node transmission rate according to a second timescale, and scheduling transmissions in the distributed sensing and control network based on interference relationships determined via the PRKS protocol such that no concurrent transmissions interfere with transmissions received at a receiving sensing/control node, and allocating time slots and channels to individual links at the second timescale, such that the scheduling and channel assignment of each transmission ensure a desired link reliability and data delivery timeliness.

In another example of any of the above described distributed sensing and control networks the probabilistic path delay is at least partially based on network traffic statistics.

In another example of any of the above described distributed sensing and control networks the network is a device to device (D2D) network, and wherein each node further includes instructions configured to determine a local deadline of a packet, and wherein the local deadline is derived using information including at least a link/path delay distribution.

In another example of any of the above described distributed sensing and control networks the exclusion region is defined at least partially by at least one of a signal strength and a geometric length of the corresponding link to the node.

An exemplary multiscale method for controlling wireless transmissions in a distributed sensing and control network, including the steps of ensuring an instantaneous transmission reliability greater than a reliability threshold of a transmission by adjusting a K parameter of a physical-ratio-K (PRK) interference model according to a first timescale and adjusting at least one of a channel assignment, a node transmission signal power and a node transmission rate according to a second timescale, and scheduling transmissions in the distributed sensing and control network based on interference relationships determined via the PRKS protocol such that no concurrent transmissions interfere with transmissions received at a receiving sensing/control node.

In another example of the above described exemplary multiscale method for controlling wireless transmissions in a distributed sensing and control network the probability for a receiving sensing/control node to correctly receive a transmission from a sensing/control node at each time instant t is no less than a threshold value, wherein the threshold value is determined by a networked sensing and control application.

In another example of any of the above described exemplary multiscale methods for controlling wireless transmissions in a distributed sensing and control network adjusting the parameter K of the PRK interference model according to a first timescale occurs on a timescale on the order of multiple packet transmissions.

In another example of any of the above described exemplary multiscale methods for controlling wireless transmissions in a distributed sensing and control network adjusting the at least one of the channel assignment, the node transmission signal power and the node transmission rate according to the second timescale occurs on a timescale on the order of a single packet transmission.

In another example of any of the above described exemplary multiscale methods for controlling wireless transmissions in a distributed sensing and control network adjusting the parameter K of the PRK interference model comprises increasing the parameter K of the PRKS protocol in response to an instantaneous link reliability that is lower than an instantaneous required link reliability.

In another example of any of the above described exemplary multiscale methods for controlling wireless transmissions in a distributed sensing and control network adjusting the parameter K of the PRK interference model comprises decreasing the parameter K of the PRKS protocol in response to an instantaneous link reliability that is higher than a required instantaneous link reliability.

Another example of any of the above described exemplary multiscale methods for controlling wireless transmissions in a distributed sensing and control network further includes allocating time slots and channels to individual links at the second timescale, such that the scheduling and channel assignment of each transmission ensure a desired link reliability and data delivery timeliness.

An exemplary multi-hop method for operating a distributed sensor and control network includes controlling predictable single-hop communication via real time scheduling for a predictable exploration of real time capacity region, multi-scale control of at least one of node channel assignment, node power control, node rate control, and adjustment of a parameter K value of a physical-ratio-K (PRK) interference model, applying the predictable single-hop communication control to each hop of a multi-hop communication, thereby generating a schedule for predictable multi-hop communication.

In another example of the above described exemplary multi-hop method for operating a distributed sensor and control network the predictable multi-hop communication is a communication for a device to device (D2D) network.

In another example of any of the above described exemplary multi-hop methods for operating a distributed sensor and control network D2D network further includes single-hop communication.

In another example of any of the above described exemplary multi-hop methods for operating a distributed sensor and control network the method includes a multiscale real-time routing framework configured to route messages between nodes according to at least a first time scale and a second timescale, with the first timescale being longer than the second timescale.

In another example of any of the above described exemplary multi-hop methods for operating a distributed sensor and control network the first time scale is on the order of an expected number of transmissions required to successfully deliver a packet, and candidate multi-hop paths for packet delivery are determined according to a directed acyclic graph.

In another example of any of the above described exemplary multi-hop methods for operating a distributed sensor and control network for each node $v_i$ in the network, the directed acyclic graph $G_0$ maintains a set of forwarder candidates for each transmission power, and, at a given transmission power, the set of forwarder candidates includes a node $v'_i$ if $(v_i, v'_i) \in G_0$ and $v'_i$ are capable of receiving packets from $v_i$ at a current transmission power.

In another example of any of the above described exemplary multi-hop methods for operating a distributed sensor and control network a required per-packet transmission reliability for each transmission is determined such that a mean delay in delivering the packet from a sending node to a receiving node is minimized, while simultaneously maintaining a link reliability, according to a real-time link capacity model.

In another example of any of the above described exemplary multi-hop methods for operating a distributed sensor and control network each node in the distributed sensor and control network maintains a mean and a variance of communication delay along each link associated with the node at the first timescale for each transmission power.

In another example of any of the above described exemplary multi-hop methods for operating a distributed sensor and control network each node in the distributed sensor and control network maintains a minimum probabilistic delay to the receiving node, and wherein the minimum probabilistic delay path is based at least partially on in-situ queueing levels in the distributed sensor and control network.

In another example of any of the above described exemplary multi-hop methods for operating a distributed sensor and control network further including the steps of a node identifying a set of forwarder candidates capable of delivering a packet to a receiving node within a specified deadline and probability guarantee in response to receiving a packet to be delivered, the node selecting one of the forwarder candidates based at least in part on at least one application specific metric, and the node transmitting the packet to the forwarder candidate at a corresponding transmission power.

DETAILED DESCRIPTION OF AN EMBODIMENT

Figure 1:
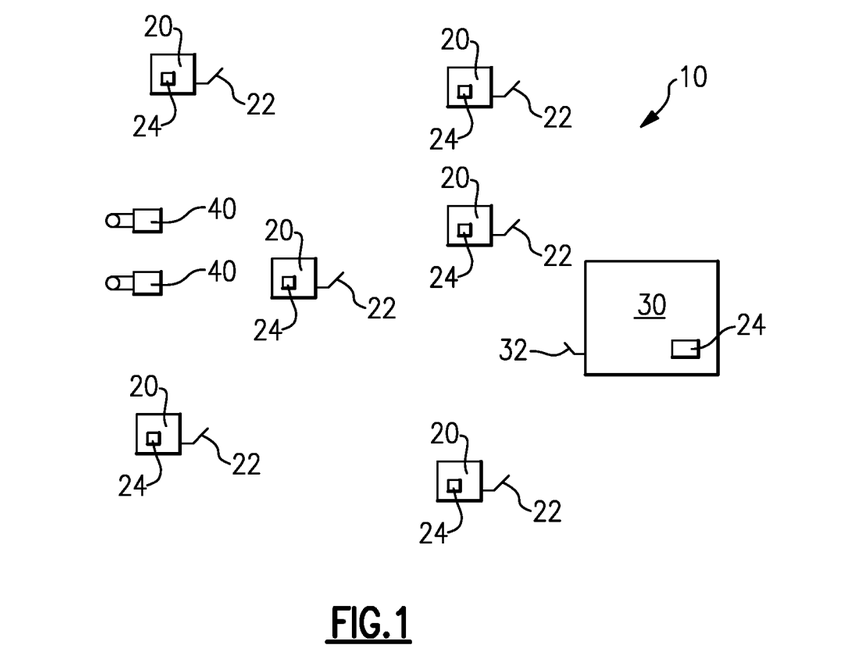
FIG. 1 illustrates a distributed sensing and control network utilizing a PRKS scheduling protocol.

FIG. 1 illustrates an example distributed sensing and control network 10 including multiple distributed sensors 20 and a central controller 30. Each of the distributed sensors 20 includes a wireless transmitter/receiver 22, and the central application controller 30 includes a wireless transmitter/receiver 32. Each of the sensors 20 and the central application controller 30 also includes a local controller 24 having a memory. The memory on the local controller 24 stores instructions for operating the corresponding remote sensor 20 or central application controller 30. Included among these instructions is a physical-ratio-K scheduling (PRKS) protocol instruction that controls the message scheduling from each of the sensors 20 in the manner described below. The illustrated example sensing and control network 10 can be any sensing and control network having multiple sensors 20 in close physical proximity to each other including, but not limited to, a distributed sensing and control network in an automobile, an industrial automation system, or a fleet of vehicles.

During operation of the distributed sensing and control network 10, each of the sensors 20 transmits information related to the sensed component or process to the controller 30 or to other sensors 20 in the distributed sensing and control network 10. The controller 30 utilizes a combination of data from the sensors 20 to determine appropriate responses and transmits the responses to actuators 40 within the system. In alternate distributed sensing and control networks 10, some or all of the sensors 20 can include actuators or other responsive components and receive instructions from the central controller 30. In a practical implementation, none, some, or all, of the sensors 20 communicate directly with at least one other sensor 20 without transmitting through the controller 30. Each of the sensors 20 and the controller 30 are alternately referred to below as a "node".

Due to the nature of wireless signal propagation, transmission from a sensor 20 can interfere with transmissions received by other sensors 20, should the transmissions temporally overlap. In order to prevent this overlap and interference, a robust message scheduling protocol based on a physical-ratio-K (PRK) model is implemented in each of the sensors 20. The PRK-based scheduling protocol is referred to as a PRKS protocol.

To address the drawbacks of a protocol and physical interference model in supporting predictable interference control in the presence of uncertainties, an interference model is required that is both local and of high-fidelity. Being both local and high fidelity is important for the agility and predictability of interference control respectively. To this end, a physical-ratio-K (PRK) interference model 100 that integrates the protocol model's locality with the physical model's high-fidelity is disclosed herein, and illustrated in FIG. 2.

Figure 2:
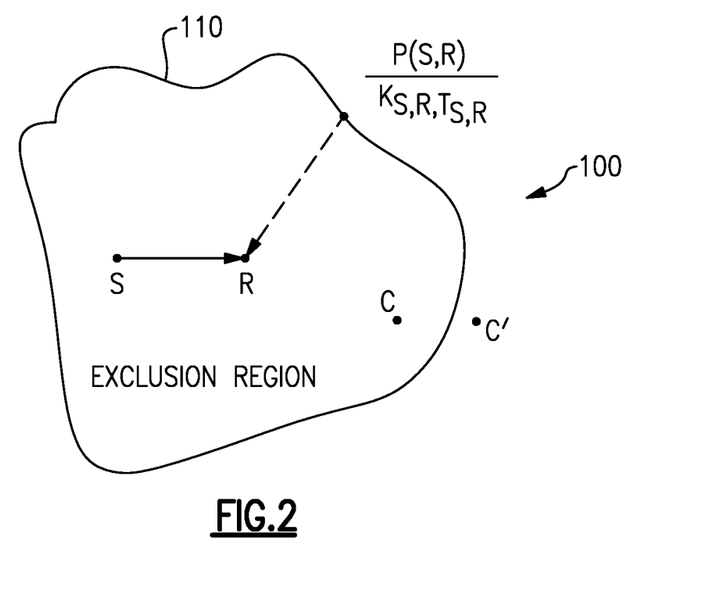
FIG. 2 illustrates a physical-ratio-K (PRK) interference model.

In the PRK model 100, a node C' does not interfere with node S, and thus can transmit concurrently with the transmission from node S to its receiver R. Non-interference is true when $$P(C', R) < \frac{P(S, R)}{K_{S,R,T_{S,R}}}$$

where P(C', R) and P(S, R) is the average strength of signals reaching R from C' and S respectively, $K_{S,R,T_{S,R}}$ is a minimum real number chosen such that, in the presence of background noise and cumulative interference from all concurrent transmitters, the probability for R to successfully receive packets from S is no less than a minimum link reliability $T_{S,R}$ required by wireless networked sensing and control (WSC) applications. As shown in FIG. 2, the PRK model 100 defines, for each link (S, R), an exclusion region 110 around the receiver R such that a node C is in the region when $$P(C, R) \geq \frac{P(S, R)}{K_{S,R,T_{S,R}}}.$$

The exclusion region is a geographical region around a given node in which interference can occur. Accordingly, every node C in the exclusion region 110 is regarded as interfering with node S. Therefore, every node C is prevented from transmitting concurrently with the transmission from S to R.

To enable a predictable interference control in the presence of network and environmental uncertainties, the parameter $K_{S,R,T_{S,R}}$ of the PRK model is adapted to the specific network and environmental conditions. The adaption ensures that application-specific link reliability requirements are met. By ensuring that the required link reliability is met, and by using signal strength instead of geographic distance in model formulation, the PRK model 100 captures the properties of wireless communication (e.g., cumulative interference and anisotropic signal propagation) and thus is of high-fidelity.

To enable a distributed protocol design and implementation, the PRK model is also local. By way of example, the parameters of the PRK model are either locally measurable (i.e., for the signal strength and link reliability between close-by nodes) or locally controllable (i.e., for $K_{S,R,T_{S,R}}$ of each link (S, R)). As such the PRK-based scheduling (PRKS) does not need to rely on parameters such as the geographic location of the nodes S, R, C, C' or channel path loss between geographically far-away nodes.

In another example, only pairwise interference relations between close-by nodes are defined in the PRK model. As such, PRK-based scheduling does not require explicit global coordination. By ensuring the required link reliability, PRK-based scheduling also helps reduce data delivery delay. The reduction in data delivery delay is achieved by minimizing the need for packet retransmissions by increasing the packet delivery reliability. Further, while ensuring application-required reliability, PRK-based scheduling can also enable a channel spatial reuse very close to (e.g., >95%) what is feasible in optimal physical-model-based scheduling. Therefore, a PRK based model is a good foundation for predictable interference control.

The definition of the PRK interference model is based on signal power between close-by nodes. To use the PRK model in data transmission scheduling, nodes need to maintain local signal maps (which include information about wireless signal power attenuation between close-by nodes) so that interfering nodes and links can be aware of their mutual interference relations. For networks of no or low node mobility, the average signal power between nodes does not change at timescales such as seconds, minutes, or even hours. Accordingly, the frequency of signal map update and thus the overhead of signal map maintenance tends to be low for networks of no or low mobility.

For mobile networks such as vehicular networks, however, node mobility makes average signal power between close-by nodes fast-varying in nature, for instance, at the timescales of seconds or less in vehicular networks. Application of the PRK interference model to mobile networks, would result in the local signal maps between close-by nodes needing to be updated frequently in order to ensure that nodes are aware of their mutual interference relations. This would introduce significant overhead.

In mobile networks such as vehicular network systems, node locations are usually readily available through GPS and/or other mechanisms such as simultaneous-localization-and-mapping (SLAM). Using node locations, it is easy for nodes to know the distances between themselves. To avoid the significant overhead (and, in some cases, infeasibility) of maintaining accurate signal maps in mobile networks and considering the fact that, on average, closer-by nodes tend to introduce higher interference signal power to one another than farther away nodes, we can leverage the availability of node location information to define a geometric approximation of the PRK interference model.

In the geometric approximation of the PRK model, interference relations among nodes are defined based on inter-node distance instead of inter-node signal power, and a node C' is regarded as not interfering and thus can transmit concurrently with the transmission from another node S to its receiver R if and only if $D(C', R) > D(S, R)K_{S,R,T_{S,R}}$, where D(C', R) and D(S, R) is the geometric distance between C' and R and that between S and R respectively, $K_{S,R,T_{S,R}}$ is the minimum real number (i.e., can be non-integer) chosen such that, in the presence of cumulative interference from all concurrent transmitters, the probability for R to successfully receive packets from S is no less than the minimum link reliability $T_{S,R}$ required by applications. The geometric approximation of the PRK model defines, for each link (S, R), an exclusion region around the receiver R such that a node C is in the exclusion region if and only if $D(C, R) \leq D(S, R) K_{S,R,T_{S,R}}$.

Similar to the PRK model, its geometric approximation is local since only local, pairwise interference relations are defined between close-by vehicles, and the geometric approximate PRK model is suitable for reliable inter-node communication since it ensures the application-required link reliability by considering wireless communication properties such as cumulative interference. Unlike the PRK model where the exclusion region around a link may be of an irregular shape due to anisotropic wireless signal propagation, the exclusion region around a link in the geometric approximate PRK model is of the regular shape of a disk.

With the geometric approximation of the PRK model, a mobile node (e.g., a vehicle) only needs to share its location with potentially interfering nodes in order for an interfering node to detect their mutual interference relation using the approximate PRK model, and a node does not need to share with other nodes the signal power from every other potentially interfering node to itself.

In practice, the PRK model or its geometric approximation may be used depending on the availability of node location information and the amount of control signaling overhead tolerable in a network system. In what follows, we use "PRK model" to denote the PRK model and its geometric approximation discussed above.

A basic task in PRK-based scheduling is to instantiate the PRK model, i.e., identify the parameter $K_{S,R,T_{S,R}}$ for every link (S, R), according to in-situ, potentially unpredictable network and environmental conditions. It is difficult to characterize the relation between $K_{S,R,T_{S,R}}$ and the packet delivery reliability along (S, R) in a closed-form, and the relation is complex and dependent on network and environmental conditions. In many examples, the network and environmental conditions are unpredictable when the system is being designed. To address the unpredictability, the PRK model instantiation problem is formulated as an online regulation control problem, where the "plant" is the link (S, R), the "reference input" is the required link reliability $T_{S,R}$. The "output" is the actual link reliability $Y_{S,R}$ from S to R, and the "control input" is the PRK model parameter $K_{S,R,T_{S,R}}$.

To address the difficulty in characterizing the "plant model" on the relation between the control input $K_{S,R,T_{S,R}}$ and the control output $Y_{S,R}$, the impact that the change of the PRK model parameter $K_{S,R,T_{S,R}}$ has on receiver-side interference is treated as the actual control input. The change in the parameter affects a corresponding change to the exclusion region 110 around the receiver R. The change to the exclusion region 110, in turn, alters the concurrent transmissions along with the transmission from S to R. This, in turn, leads to a change in the interference power at receiver R.

Figure 3:
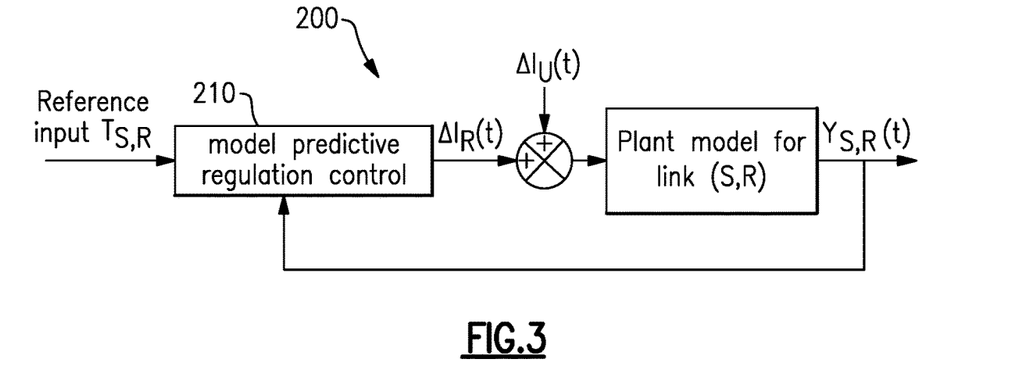
FIG. 3 illustrates an exemplary system model of the PRK instantiation.

Accordingly, this change in interference power, denoted by $\Delta I_R$, is regarded as the actual control input in control algorithm design. This way existing communication theory is leveraged to derive a plant model on the relation between $Y_{S,R}$ and $\Delta I_R$. An exemplary system 200 model is illustrated in FIG. 3.

In the system model 200 $\Delta I_U(t)$ is the change in the average total interference power introduced to R by all the nodes (e.g., nodes similar to C') outside the exclusion region 110 around R at instantaneous time t, and $\Delta I_U(t)$ is the "disturbance" to the system. Given the probabilistic nature of wireless communication, and the random disturbance $\Delta I_U(.)$, from outside of the exclusion region 110 of node R, the link reliability $Y_{S,R}$ (t) is expected to be inherently random. Thus, system model 200 minimizes the variance of $Y_{S,R}$ (t) while simultaneously ensuring that the mean value of $Y_{S,R}$ (t) is no less than the required link reliability. Mean-variance regulation is then utilized to derive a controller 210 for instantiating the PRK model parameter according to a known methodology.

Given the instantiated PRK model parameter $K_{S,R,T_{S,R}}$, discussed above, and using a local signal map that contains an average signal power attenuation between R and every node C close-by, node R can identify a set of nodes whose transmissions can interfere with, and thus cannot be concurrent with, the transmission along a link (S, R). With precise awareness of mutual interference relations with close-by nodes/links, nodes S, R, C, C' can schedule data transmissions in a randomized TDMA fashion using a distributed Optimal-Node-Activation-Multiple-Access (ONAMA) algorithm to avoid concurrent transmissions along interfering links. The resulting PRK-based scheduling protocol is denoted as PRKS.

Figure 4:
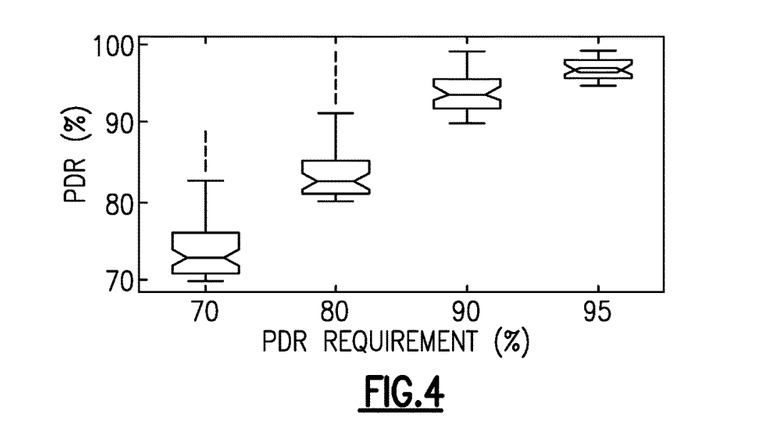
FIG. 4 illustrates packet delivery reliability for multiple exemplary PRKS instantiations.
Figure 5:
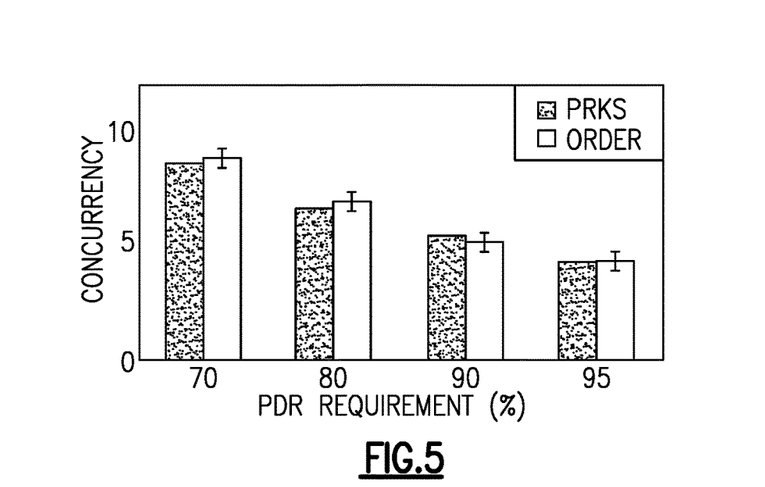
FIG. 5 illustrates a comparison of confidence intervals between the PRKS model and an exemplary centralized physical-model-based schedule.

The distributed controllers for PRK model instantiation enable network-wide convergence to a state where the desired mean link reliabilities are ensured, as shown by FIG. 4. With local, distributed coordination alone, PRKS achieves a channel spatial reuse very close to what is enabled by the exemplary state-of-the-art centralized physical-model-based schedulers, while still ensuring the required mean link reliability. FIG. 5 illustrates a comparison of confidence intervals between the PRKS model 200 and an exemplary centralized physical-model-based schedule.

Figure 6:
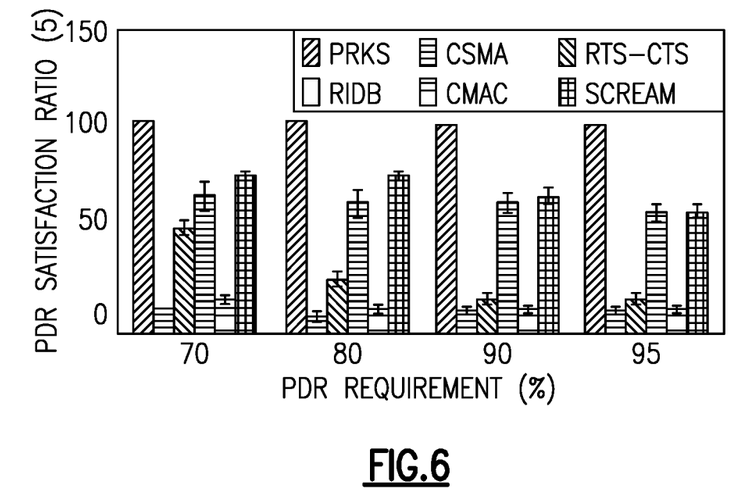
FIG. 6 illustrates a comparison of the mean link reliability of multiple exemplary link scheduling systems.

Currently used scheduling protocols have a link reliability that is unpredictable and the ratio of links whose reliability meets application requirements can be as low as 0%. Unlike the currently used systems, PRKS enables a predictably high link reliability (e.g., 95%) for all the links in different network and environmental conditions without a priori knowledge of the network and environmental conditions. A comparison of the mean link reliability of multiple link scheduling systems is shown in FIG. 6, where CSMA is a contention-based MAC protocol that uses the basic CSMA/CA mechanism to ameliorate the impact of co-channel interference, RTS-CTS is a contention-based MAC protocol that uses CSMA/CA and RTS-CTS to ameliorate the impact of co-channel interference and hidden terminals, RIDB is a TDMA scheduling protocol that uses a TDMA protocol similar to the one used in PRKS and that uses the physical interference model to derive interference relations between nodes but ignores cumulative interference in networks, CMAC is a contention-based MAC protocol where a node transmits at a time instant only if the SINR of this transmission and the SINRs of other concurrent transmissions overheard by the node are above a certain threshold (e.g., for ensuring a certain link reliability), and SCREAM is a TDMA scheduling protocol using the SCREAM primitive to schedule concurrent transmissions according to the physical interference model. By ensuring the required mean link reliability in scheduling, a PRKS based protocol also enables a lower communication latency and a higher network throughput than existing scheduling protocols.

While discussed above with regards to the utilization of PRKS scheduling in a single-hop (direct link communication) wireless communication system, PRKS can also be applied to a multi-hop wireless communication system.

For real-time multi-hop communication, one factor that can affect a required timeliness of data delivery is selecting the multi-hop paths. The problem of checking probabilistically-guaranteed path delays is NP-hard. As it relates to PRKS schedules, given the delay distributions of the individual links along a path, it is NP-hard to determine whether the probability of having a path delay less than a certain upper bound is no less than a required probability to guarantee non-interference of the transmission, such as 95%

To circumvent the computational complexity, one existing option is to first sample the path delay and then use non-parametric approaches to estimate delay quantiles based on these delay samples. Another existing alternative is to sample statistics (e.g., mean and variance) of path delays and then use probability inequalities to derive bounds on probabilistic delays. The highly-varying distribution and statistics of path delays make it difficult to precisely estimate them by directly sampling path delays or their statistics.

To address the challenge of highly-varying path delays, the multi-hop system disclosed herein decomposes contributors to path delay variations into two factors: dynamic packet-time (i.e., per-packet transmission time) and dynamic queueing.

By leveraging the different timescales at which packet-time distributions and queueing levels vary, a multi-timescale-estimation (MTE) method that accurately estimates the highly-varying mean and variance of path delay is enabled. The MTE method accurately estimates the mean and variance of packet-time in a longer timescale and adapts to fast-varying queueing in a shorter timescale.

In particular, the MTE design is based on three observations. First, given a network condition, the distribution of packet-time is stable despite the quick variation of individual packet-time. This stability enables accurate estimation of the mean and variance of the packet-time at each hop. The MTE design then derives, for a time instant, the mean total delay at a given hop as the multiplication of the mean packet-time at the hop and the in-situ queueing level. The mean path delay is the sum of the mean total delay at each hop.

Second, the packet-times for different transmissions, whether from the same node or from different nodes, tend to be uncorrelated. The lack of correlation enables, for a time instant, the derivation of the variance of the total delay at a given hop as the multiplication of the packet-time variance at the hop and the in-situ queueing level. The variance of path delay is the sum of the variance of the total delay at each hop.

Thirdly, network queueing and the mean and variance of per-hop delays are relatively stable at short timescales of a few packet transmissions. The stability at short timescales enables distributed, accurate estimation of the mean and variance of path delays through quick diffusion-computation (e.g., piggybacking control information with regular data packet transmissions). The estimated mean and variance of path delays are then used to derive probabilistic delay bounds via probability inequalities.

Figure 7:
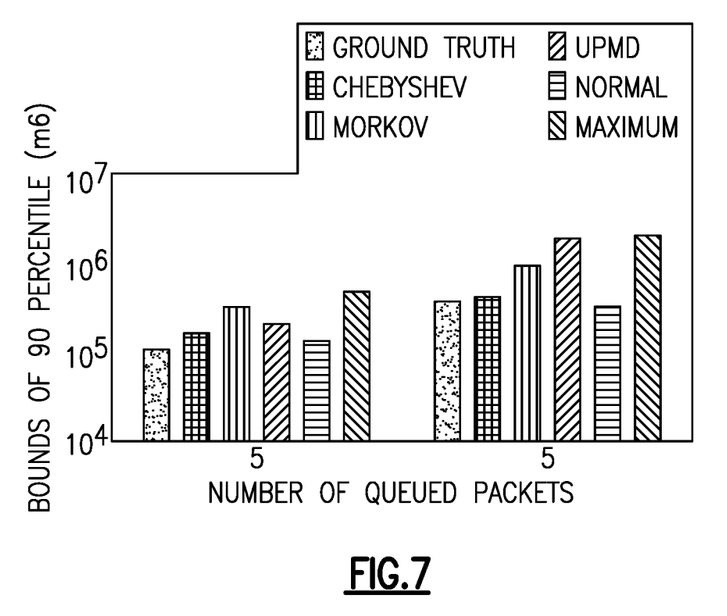
FIG. 7 illustrates the ground truth and the estimated 90-percentile of the path delay for an exemplary five-hop path in some existing systems.

For an exemplary five-hop path in in some existing systems, such as NetEye, FIG. 7 shows the ground truth and the estimated 90-percentile of the path delay when the total number of queued packets along the path are 5 and 40 respectively. For comparison purposes, the probabilistic delay bounds estimated via Chebyshev Inequality, Markov Inequality, the optimal-partition-minimum-delay (OPMD) method, or by assuming path delay as normally distributed are also illustrated. Also illustrated in FIG. 7 is the maximum path delay.

The maximum path delay is orders of magnitude greater than the bound of the Chebyshev Inequality, thus using probabilistic delay bound instead of maximum path delay helps improve application-usable real-time capacity. The bound by the Chebyshev Inequality is close to the probabilistic path delay. The bound by assuming the path delay is normally distributed is also close to the path delay. However, the assumption that the path delay is normally distributed may underestimate the path delay. For this reason, assuming the path delay is normally distributed is unsuitable for providing a real-time guarantee. In some example multi-hop systems, such as the example system discussed below, the bounds determined by the Chebyshev Inequality are utilized for the 90-percentile of path delay.

Real-time routing is subject to dynamics and uncertainties at multiple timescales. At a longer timescale, such as the timespan of multiple packet transmissions, link properties such as an expected number of transmissions required to successfully deliver a packet (ETX) vary as a result of changing environmental conditions (e.g., temperature). At a shorter timescale, such as the timespan of a single packet transmission, data transmission delay varies on a per-packet basis. Due to the highly varying nature of path delays, routing messages using delay-based metrics can introduce large estimation errors and lead to routing instability as well as to low performance quality. To ensure long-term stability and optimality while addressing short-term dynamics at the same time, a multi-timescale adaptation (MTA) framework for real-time routing is utilized. The MTA framework for real-time routing functions as follows.

At longer timescales of the stability of link/path ETX, a directed acyclic graph (DAG) is maintained for data forwarding, and any path within the DAG is a candidate path for packet delivery. That is to say, any path within the DAG is eligible to be used as a packet delivery path. Given that link/path ETX reflects network throughput, data delivery reliability, and the overall trend of data delivery delay, and that ETX based routing structures tend to be stable even if ETX is dynamic, the multi-hop packet delivery discussed herein maintains the data forwarding DAG based on link and path ETX such that the DAG reflects long-term system optimality and the DAG changes relatively slowly compared with delay variation. More specifically, there is a directed edge from node $v_i$ to $v'_i$ in the DAG when the minimum path ETX from $v'_i$ to the sink node $v'_0$ is less than that from $v_i$ to $v'_0$. The DAG defines, for each node $v_i$, a set of forwarder candidates $R(v_i)$ where $v'_i \in R(v_i)$ when link $(v_i, v'_i)$ is within the DAG.

At shorter timescales of individual packet transmissions, the spatiotemporal flow of packets within the data forwarding DAG is adaptively controlled. The adaptive controls ensure reliable, real-time data delivery in the presence of short-timescale dynamics such as transient packet losses and per-packet variations of link delay. More specifically, each packet contains information about the remaining time to deadline, denoted by L, and the required real-time guarantee probability, denoted by q. When the packet reaches a node $v_i$, $v_i$ first finds, using information provided by MTE-based probabilistic path delay estimation, the set of forwarder candidates within the DAG, denoted by $R'(v_i, L, q)$, that can ensure the real-time requirements L and q. Then $v_i$ sets the next-hop node of the packet as the node of the smallest path ETX to $v'_0$ among all the nodes in $R'(v_i, L, q)$, and $v_i$ puts the packet in the transmission queue for transmission to the next node.

Figure 8:
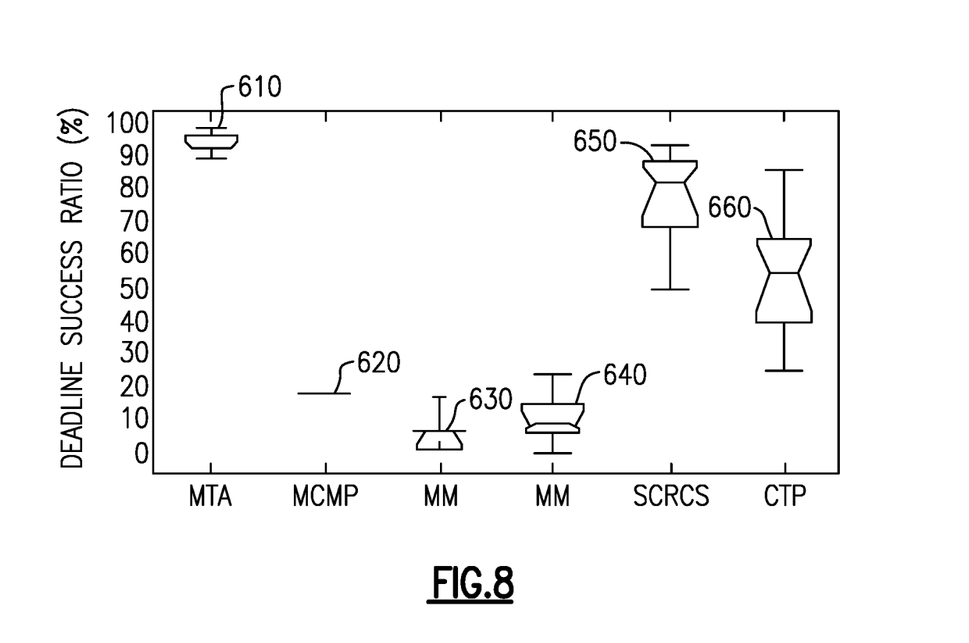
FIG. 8 illustrates the ratios of packets delivered to a given node before a deadline for a multiscale time adaption system and existing protocols in a first exemplary testbed.
Figure 9:
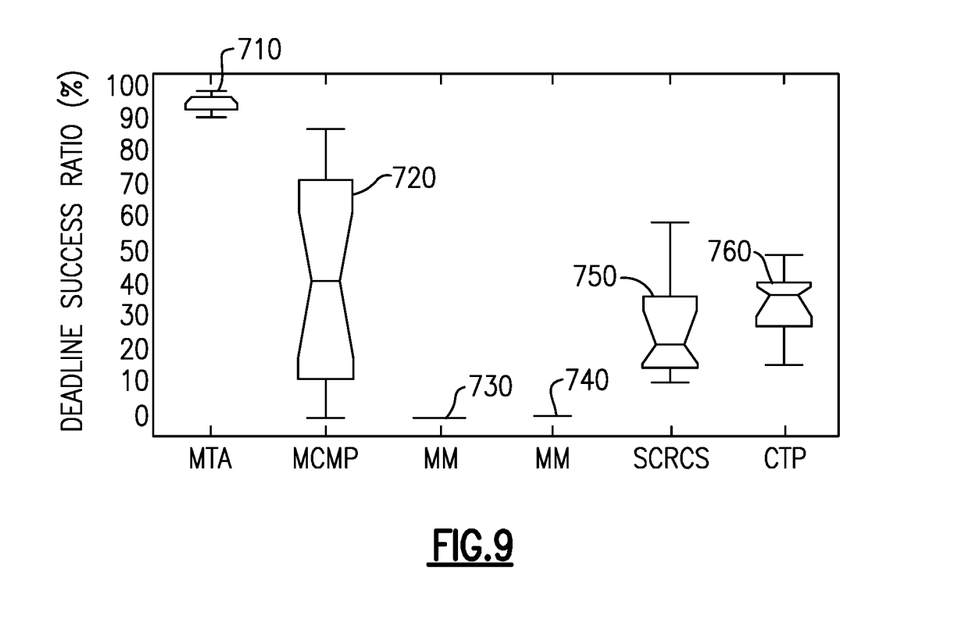
FIG. 9 illustrates the ratios of packets delivered to a given node before a deadline for a multiscale time adaption system and existing protocols in a second exemplary testbed.

For typical convergecast traffic in exemplary sensor network testbeds, such as NetEye and Indriya, where packets need to be delivered to a given node within 2 seconds at a probability no less than 90%, FIGS. 8 and 9 show the ratios of packets delivered to the given node before their deadlines when using MTA 610 and existing protocols MCMP 620, MM 630, MM-CD 640, SDRCS 650, and CTP 660 in the exemplary sensor network testbeds, with FIG. 8 illustrating a NetEye testbed and FIG. 9 illustrating a Indriya testbed. The MTA consistently ensures real-time data delivery in both exemplary sensor network testbeds. In contrast, the ratios of packets delivered within deadlines tend to be quite low and unpredictable in existing protocols.

In order to realize the full potential of real-time WSC systems, the WSC system disclosed herein leverages multiscale interaction structures of networking mechanisms (e.g., scheduling, channel assignment, power control, and routing) as fundamental principles for ensuring predictable communication reliability, timeliness, and throughput despite the presence of uncertainties.

Figure 10:
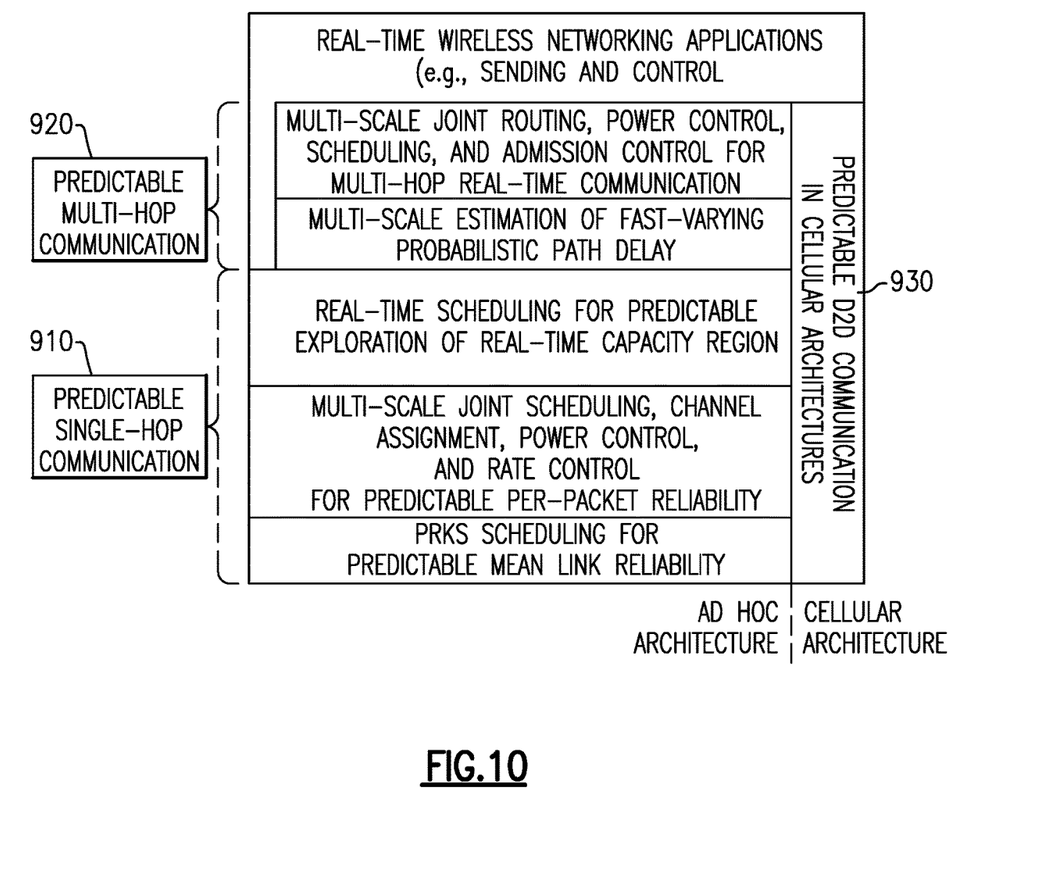
FIG. 10 schematically illustrates the multi-scale methodologies disclosed herein, including single-hop, multi-hop, and cellular D2D wireless communications.

FIG. 10 schematically illustrates the multi-scale methodologies disclosed herein, including single-hop, multi-hop, and cellular D2D wireless communications. The methodologies are applicable to immobile and mobile WSC networks, ad-hoc networks, and cellular network architectures. For explanatory purposes, the discussion below is directed toward ad-hoc WSC networks. One of skill in the art will appreciate that the methodologies can be adapted to other network types without requiring substantial amounts of experimentation.

The first methodology illustrated is a methodology 910 for achieving a predictable single-hop communication.

Building upon the predictable mean link reliability that is enabled by PRKS, the predictable single-hop communication utilizes multiscale mechanisms that integrate longer timescale adaptation of PRKS-defined interference relations between nodes/links with shorter-timescale adaptation of channel assignment, power control, and rate control to ensure predictable reliability of each packet transmission. The predictable single-hop communication also leverages the multiple degrees of freedom enabled by joint scheduling, channel assignment, power control, and rate control to control the tradeoff between communication reliability, timeliness, throughput, and energy efficiency. Based on the mechanisms of predictable per-packet transmission reliability control and tradeoff control, the single-hop methodology utilizes real-time scheduling mechanisms that model the real-time capacity regions of single-hop transmissions and make application-specific tradeoffs between reliability, timeliness, throughput, and energy efficiency.

The second methodology illustrated is a methodology 920 for achieving a predictable multi-hop communication. The methodology 920 for achieving multi-hop communications builds upon the multi-timescale estimation method that accurately characterizes probabilistic path delays in a distributed, agile manner and the predictable single-hop communication mechanisms, shown in the first methodology 910. Multiscale, online learning mechanisms are utilized that adapt the data forwarding graph, estimation of the mean and variance of link delays, and source traffic at longer timescales. The online learning mechanisms also estimate path queueing levels and control multi-hop routing, transmission power, and scheduling at shorter timescales. Operating at the shorter timescales ensures predictable reliability, timeliness, and throughput as well as tradeoff in multi-hop communications.

The third methodology illustrated is a methodology 930 for achieving predictable device to device (D2D) communications within a cellular architecture. The data plane of device to device (D2D) communication in emerging cellular communication architectures, such as those in LTE-Advanced and 5G, resembles the data plane in an ad hoc network architecture. The D2D control plane varies in that the D2D control plane has the option of using cellular base stations for control signaling. The methodology 930 for achieving the predictable D2D communications leverages the availability of central control signaling and the multiscale principles of predictable ad hoc communication described herein.

The adaptation of the PRK model parameters and the resulting nodes/links' interference relations in PRKS is at a timescale of multiple packet transmissions to ensure predictable mean packet delivery reliability. Due to fast-varying channel fading and potential external interference which may change at a timescale of a few milliseconds, however, the receiver-side interference power and thus the instantaneous packet delivery reliability tend to vary from one packet transmission to another. Thus PRKS alone is unable to ensure per-packet delivery reliability which is needed for enabling per-packet delivery timeliness in real-time sensing and control. To ensure predictable per-packet delivery reliability in the presence of fast-varying dynamics and uncertainties the single hop methodology 910 integrates PRKS with the networking mechanisms of channel assignment, power control, and rate control. The networking mechanisms are adapted on a per-packet basis.

The first methodology utilizes Multiscale joint scheduling, channel assignment, power control, and rate control to achieve predictable per-packet reliability. Existing approaches to channel assignment, power control, rate control, and their joint design with scheduling do not ensure predictable per-packet delivery reliability. By controlling interference in a predictable manner in channel access scheduling, while only requiring coordination between close-by nodes/links, PRKS enables the joint design of scheduling, channel assignment, power control, and rate control to ensure predictable per-packet reliability. In particular, with local interference relations being defined by the PRK model, and the PRKS-based control of interference to be below a certain threshold, each link is able to adapt channel assignment, power control, and rate control on a per-packet basis according to in-situ receiver-side interference and noise power, thus enabling per-packet delivery reliability above the required reliability threshold.

For channel assignment, interfering links are prevented from being assigned with the same channel and time slot. To achieve this, the distributed PRKS algorithm can be extended so that, for each link at each time slot, two assignment rules apply. First, each channel is assigned in a randomized manner to either the link itself or one of its interfering links for which, based on the in-situ interference plus noise power at the receiver, a feasible transmission power and rate can be chosen such that the success probability of the packet transmission in the channel is no less than the required per-packet reliability. Second, the number of channels assigned to a link is no more than the number of channels it can utilize simultaneously. According to these assignment rules, the channel used by a link randomly switches from one channel to another over time while ensuring per-packet reliability in the presence of external interference and fast-varying dynamics such as channel fading.

If, starting at a given time instant, there is no channel that can be assigned to a link such that a feasible transmission power and rate can be chosen to ensure the required per-packet reliability, the PRK model parameter K for the link is increased to reduce interference from within the network. Alternatively, if the per-packet reliability is higher than is required at every channel even with the minimum transmission power and highest transmission rate, the PRK model parameter K can be decreased to save power and to increase network real-time capacity.

When a channel continuously experiences strong external interference (e.g., interference power being significantly higher than that in other channels continuously), the channel can be blacklisted and not used any more. With multiple channels, the exclusion regions of links are typically much smaller than single channel examples. The smaller exclusion regions not only increase network real-time capacity, but also make it easier for interfering links to coordinate with one another.

After channel assignment, the transmission power and rate are selected based on in-situ receiver side interference plus noise power and the required per-packet delivery reliability. In particular, given a selected transmission rate and thus a corresponding modulation and coding scheme, the desired receiver side signal-to-interference-plus-noise-ratio (SINR) can be decided to ensure the required per-packet reliability. Then, according to a distributed Foschini-Miljanic-type power control algorithm, the transmission power is selected to ensure the desired SINR for the packet transmission.

Depending on the in-situ interference plus noise power, there may be multiple choices of power-rate combinations able to ensure the required per-packet reliability. In such a case, a choice of higher transmission power, at the cost of more power consumption, enables higher transmission rate and thus lower delay and higher throughput. The choices in such a circumstance are provided to higher-layer system components (e.g., real-time scheduling and control applications) for evaluating application-specific tradeoffs between delay, throughput, and power consumption.

With the aforementioned framework for joint scheduling, channel assignment, power control, and rate control, the PRK model parameter K is adjusted at longer timescales (e.g., tens of packet transmissions) and the channel assignment as well as power and rate control is executed at shorter timescales of individual packet transmissions to ensure the required per-packet reliability. The multi-scale system utilizes tools such as stochastic geometry (e.g., for analyzing network-wide interference), Perron-Frobenius theory (e.g., for analyzing power control), and multiscale stochastic control (e.g., for treating interacting dynamics and controls of different timescales) in implementing and analyzing the multiscale solutions. In alternative examples, additional known tools for analyzing the wireless network in addition to the previous list are used.

The multiscale framework for joint scheduling, channel assignment, power control, and rate control includes the following features. Firstly, the availability of multiple channels is leveraged not only to increase overall network throughput but also to adapt to fast varying external interference and inherent network dynamics (e.g., fading wireless channels and varying internal interference). Secondly, the way the PRKS-based scheduling and power control interact is such that, when a link is scheduled for transmission, closer-by links instead of farther-away links are silenced (i.e., prevented from transmission) according to the PRK model. This scheduling is consistent with power control theories which observe that, for maximizing concurrency and throughput in joint scheduling and power control where a specific link needs to be scheduled for transmission in a time slot, it is desirable to silence closer-by links first. PRKS also functions well when different nodes use different transmission powers.

Thirdly, PRKS-based scheduling and power control also enable another dimension of flexibility in the tradeoff between power consumption and network real-time capacity. At the cost of expanded exclusion region and thus potentially reduced real-time communication capacity, for instance, using a larger PRK model parameter K can reduce interference and thus enable the use of lower transmission power. Based on the in-situ receiver-side interference plus noise power and the current PRK model parameter K, the different choices of the exclusion region and corresponding transmission power can be exposed to higher-layer networking components (e.g., real-time scheduling via a scheduling controller) for making decisions regarding the application specific tradeoffs between real-time capacity and power consumption.

With the achievement of predictable per-packet transmission reliability enabled by the first method, the second method provides for predictable, real-time communication in WSC networks.

The PRK model defines interference relations between close-by nodes only, and the locality of the interference relations facilitates the application of real-time scheduling theory in developing mechanisms for real-time communication between nodes, for instance, by treating every time slot in every channel as a resource to be shared by a link and its interfering links. To exploit this synergy between PRK-based resource management and real-time scheduling theory, the multi-scale system disclosed herein integrates real-time scheduling policies (e.g., those based on deadlines or debts) with the multiscale resource management framework discussed above with regards to the first method. In particular, the system integrates real-time scheduling policies with PRKS scheduling and channel assignment to allocate time slots and channels to individual links so that the scheduling and channel assignment conform with the priorities that real-time scheduling policies specify for links. The power and rate control mechanisms described in the first method are applied once a link has been assigned to a time slot and channel.

As discussed earlier, the PRK-based scheduling achieves a throughput very close to (e.g., more than 95%) what is feasible in optimal physical-model-based scheduling. Accordingly, the PRK-based, multiscale resource management scheme achieves close-to-optimal network real-time capacity (i.e., amount of data deliverable across links with certain reliability and timeliness guarantees). This can be analyzed using existing tools operating based on real-time systems theory, network information theory, and the like.

To fully leverage the real-time communication capacity and achieve system-wide optimization (e.g., for optimal control of a physical process), another problem to address is to characterize link-layer real-time communication capacity (i.e., amount of data deliverable across links with certain reliability and timeliness guarantees) at run-time and use the characterization in admission control and system-level optimization (e.g., joint design of networking and WSC applications).

Precisely modeling the real-time capacity of WSC networks in closed-forms is challenging due to dynamic, uncertain network and environmental conditions. To address this challenge, the multi-scale system integrates offline modeling with online measurement. Based on the exclusion regions and crosslink interference relations as defined by the PRK model, the multi-scale system characterizes the behavior of the multiscale resource management framework using tools from network information theory which are used to derive the high-level models for single-hop communications that capture the functional forms of real-time capacity regions (e.g., the frequency and amount of time for a link to transmit data of certain deadlines).

Then, in-situ communication reliability, timeliness, and throughput are measured on the fly to instantiate the models, leveraging the information exposed by our resource management schemes as discussed above with regards to the single hop system. Techniques such as perturbation analysis are employed to predict the real-time capacity in around the current operating point. The real time capacity prediction allows higher-layer system components (e.g., WSC applications or multi-hop communications) to explore the real-time capacity region for system-wide optimization.

According to PRK-based scheduling, for instance, given a link (S, R) and the packet delivery reliability of (S, R) and close-by links in a time period i, denoted by $P_{S,R}(i)$ and $P_{\overline{S,R}}(i)$ respectively, there is a conflict set $C(S, R, P_{S,R}(i), P_{\overline{S,R}}(i), i)$ that includes the set of links that cannot transmit concurrently with (S, R) in time period i. We also let $(S, R) \in C(S, R, P_{S,R}(i), P_{\overline{S,R}}(i), i)$. The links in $C(S, R, P_{S,R}(i), P_{\overline{S,R}}(i), i)$ are subject to the following wireless communication capacity constraint:

$$\sum_{L \in C(S,R,P_{S,R}(i),P_{\overline{S,R}}(i),i)} T_L(i) \le \tau_i, \quad (1)$$

$T_L(i)$ is total time duration when the link L accesses the wireless transmission media in time period i, and $\tau_i$ is the duration of period i. Together with the in-situ wireless channel condition along link L and transmission rate control (which determines the transmission rate), $T_L(i)$ determines the amount of data that can be delivered across link L in period i. Together with the real-time scheduling mechanism which determines the exact timing for L to transmit data, $T_L(i)$ also determines the timeliness of data delivery across L. Therefore, equation (1) can be transformed to real-time capacity constraints based on real-time scheduling theory and perturbation analysis. Variants of the above approach to real-time capacity characterization may also be adopted. The multi-scale system uses the real-time capacity information in designing predictable multi-hop communication mechanisms.

Exemplary multi-hop communication patterns for real-time sensing and control include convergecast (e.g., from a set of sensors to a controller), unicast (e.g., from a controller to an actuator), and broadcast (e.g., from a vehicle to surrounding vehicles). For clarity of presentation, the below disclosure is directed toward convergecast. One of skill in the art will understand that described methodology can be adapted to function within a unicast system and a broadcast system as well.

Building upon the multiscale approach to predictable real-time routing, the predictable multi-hop method 920 integrates multi-hop routing, power control, scheduling, and admission control for controllable exploration of real-time capacity regions and application-level optimizations.

Besides serving as a link-layer mechanism for per-packet reliability control as outlined above, power control can operate as a network-layer mechanism to control the tradeoff between communication delay, throughput, and energy efficiency by affecting the number of hops between sources and destinations, the sets of concurrent links allowable, and the power consumption of transmissions.

Given the difficulty in deriving optimal power control strategies for arbitrary networks in closed-forms, the following multiscale, online-learning approach to integrating power control with our multiscale real-time routing framework is utilized. At longer timescales of link/path ETX, assuming each node is transmitting at its maximum power and the link ETX is the one in the absence of interference, an ETX-based DAG $G_0$ is maintained in the same manner that MTA maintains the data forwarding DAG. For each node $v_i$ in the network, the ETX-based DAG maintains a set of forwarder candidates for each transmission power, and, at a given transmission power, the set includes a node $v'_i$ if $(v_i, v'_i) \in G_0$ and $v'_i$ can receive packets from $v_i$ at the transmission power.

When $v_i$ transmits to $v'_i$ at a certain power, the required per-packet transmission reliability is chosen such that the mean delay in reliably delivering a packet from $v_i$ to $v'_i$ is minimized according to the real-time link capacity model derived as a part of the second methodology. For each transmission power, each node maintains the mean and variance of communication delay along each of its associated links at longer timescales. At shorter timescales, and assuming each node would use its minimum-probabilistic-delay path and associated transmission power, each node maintains its minimum probabilistic delay to the sink node based on in-situ queueing levels in the network.

When a node receives a packet to be delivered, it first identifies the set of forwarder candidates which can deliver the packet to the sink within the specified deadline and probability guarantee, then it selects one of them as the forwarder based on application-specific metrics (e.g., minimize path ETX, delay, or energy consumption) and transmits the packet to the forwarder at a corresponding power.

Data transmission power is selected on the fly based on online-learning of in-situ network conditions (e.g., packet-time and queueing level) to ensure predictable real-time communication while taking into account application-specific metrics. Given the limited number of discrete power levels (e.g., 8 for the IEEE 802.15.4 compatible radio CC2420), the overhead of the aforementioned framework is moderate. In cases when the overhead is too high, mechanisms that maintain information for only a subset of the allowable transmission powers are used. Then real-time link capacity models are used to predict link properties (e.g., mean delay) for other transmission powers. When selecting and adapting the subset of powers for which to maintain information, the system leverages learning-based tools such as the multi-armed bandit theory, which has been successfully utilized in wireless networking.

Within the above framework, coordinated multi-hop scheduling is applied for real-time data delivery. Existing multi-hop real-time scheduling algorithms usually do not consider probabilistic path delay in determining the link scheduling. This limitation is addressed in the multi-scale system by integrating the probabilistic path delay estimation and control methods into existing multi-hop real-time scheduling methodologies. For instance, one existing approach is to adjust a packet's local deadline at each hop based on the remaining time to deadline and the path delay to destination. When deciding the local deadlines of packets, however, existing algorithms do not consider uncertainties in link/path delays.

To address delay uncertainties, the multi-scale system chooses the local deadline of a packet to satisfy the required probability guarantee of delivering the packet to its destination in time. This local deadline is derived from link/path delay distributions, and the predictable single-hop communication algorithms then ensure the packet delivery within its local deadline.

In one existing MTE method, the probabilistic path delay bound is derived by assuming a first-come-first-serve scheduling policy. The derived bound upper-bounds the delay with coordinated multi-hop scheduling, but the bound may be loose. To fully leverage network real-time capacity, the multi-scale system leverages network traffic statistics to infer a packet's queueing delay at individual nodes and then uses that information to derive tighter-bounds on the path delay. In parallel with the inferred quieting delay, the multi-scale system also utilizes tools, such as large-deviation-theory which enables the derivation of tighter bounds than what a Chebyshev Inequality allows.

With precise awareness of probabilistic path delays, a source node can decide whether a certain real-time data delivery request can be supported by the network, and a source node can determine the tradeoff between the timeliness and throughput of data delivery (e.g., based on unimodal relations between delay and throughput). The path delay information learned on the fly can also be used by different source nodes to coordinate their traffic rates and timeliness requirements based on tools such as convex and non-convex utility optimization, thus enabling application-level optimization.

With the aforementioned multiscale approach to joint routing, power control, scheduling, and admission control, the data forwarding DAG, the estimation of mean and variance of link delay, and the source traffic are adapted at longer timescales. The estimation of queueing levels and probabilistic delays as well as the forwarding of individual packets is adapted at shorter timescales.

Based on the above described mechanisms for predictable single-hop and multi-hop communication in the ad hoc communication architecture and leveraging the similarity between the data planes of the ad hoc architecture and D2D communication in cellular architectures, the multi-scale system described for a predictable single-hop and multi-hop communication can be adapted to enable predictable D2D communication.

In emerging cellular communication architectures such as those in LTE-Advanced and 5G, there are two modes of inter-node communications: 1) the device-to-device (D2D) mode where nodes directly exchange data packets with one another without using base stations as data relays. This mode is similar to how nodes communicate in an ad-hoc communication architecture. 2) The infrastructure mode where nodes communicate with one another through relaying at base stations. The D2D mode is usually suitable for communications between close-by nodes, while the infrastructure mode is suitable for communications between far-away nodes thanks to the relaying at base stations.

The basic principles of predictable communication in the ad hoc network architecture apply to D2D communication. In the overlay model where non-overlapping spectrum are allocated to devices in the D2D mode and infrastructure mode respectively, for instance, the multiscale approach to joint scheduling, channel assignment, as well as power and rate control (as discussed above) can be applied to the scheduling of D2D communications by treating interference from D2D devices of the same cell as internal interference and interference from D2D-mode and infrastructure-mode devices of other cells as external interference.

In the underlay model where devices in the D2D mode and infrastructure mode share spectrum, the above methodology also applies even though the scheduling of D2D-mode and infrastructure-mode devices are coupled in this case. Further, in the underlay model the PRK interference model and its online instantiation method as proposed in PRKS can be applied to precisely identify the exclusion regions for D2D links. Similarly, the exclusion region as defined by the PRK model can also be applied to protect the communications of infrastructure-mode devices from being interfered by D2D communications.

On the other hand, the central signaling by cellular base stations can facilitate and simplify the design and implementation of predictable communicating protocols. For instance, central signaling can facilitate real-time scheduling of interfering links by allowing them to easily share their scheduling priorities with one another. In vehicular WSC networks where time slots are first allocated to road segments and then to individual vehicles, the base stations may store information about the division of roads into road segments and the time slots allocated to each segment. The availability of such information at permanently-deployed base stations can simplify the implementation of networking algorithms. The above synergy between D2D cellular communication architectures and principles of predictable ad hoc communication allow the multi-scale system described above to be applied to D2D communications and enables predictable D2D communication.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A distributed sensing and control network comprising:
a plurality of sensing and control nodes, each of said sensing and control nodes including a sensor, a local controller, a local memory and a wireless transmitter/receiver, and wherein said local memory stores instructions for implementing a multiscale networking protocol for wireless transmissions, the multiscale networking protocol uses at least a first factor at a first timescale and at least a second factor at a second timescale, distinct from the first timescale, wherein the first factor and the second factor jointly ensure predictable per-packet reliability;
the at least a first factor including an instantiated physical-ratio K (PRK) interference model for scheduling wireless transmissions;
the at least a second factor including at least one of a channel assignment, a node transmission signal power control, a node transmission rate control, and a real-time scheduling control; and
a local signal map stored in said local memory, wherein said local signal map, together with the instantiated physical-ratio-K (PRK) interference model, defines an interference relationship between a sensing and control node storing said local signal map and each other sensing and control node of said plurality of sensing and control nodes within an exclusion region of said sensing and control node storing said local signal map.

2. The distributed sensing and control network of claim 1, wherein the first timescale is longer than the second timescale.

3. The distributed sensing and control network of claim 2, wherein the first timescale is on the order of multiple packet transmissions.

4. The distributed sensing and control network of claim 2, wherein the second timescale is on the order of a single packet transmission.

5. The distributed sensing and control network of claim 1, wherein the local memory stores instructions for increasing a constant (K) parameter of a physical-ratio-K-scheduling (PRKS) protocol in response to a link reliability that is lower than a required link reliability.

6. The distributed sensing and control network of claim 1, wherein the local memory stores instructions for decreasing a constant (K) parameter of a PRKS protocol in response to a link reliability that is higher than a required link reliability.

7. The distributed sensing and control network of claim 1, wherein the network includes a plurality of channels, and wherein each of said nodes is operable to transmit in at least some of the channels.

8. The distributed sensing and control network of claim 1, wherein the network is configured as one of a single hop network, a multi-hop network, and a cellular network with device to device (D2D) communications.

9. The distributed sensing and control network of claim 8, wherein the network is a multi-hop network, and wherein each of said nodes further includes instructions configured to determine a directly multi-hop data forwarding graph, and a local deadline of a packet, and wherein the local deadline is derived using a link and path delay distribution.

10. A distributed sensing and control network comprising:
a plurality of sensing and control nodes, each of said sensing and control nodes including a sensor, a local controller, a local memory and a wireless transmitter/receiver, and wherein said local memory stores instructions for implementing a multiscale networking protocol for wireless transmissions, the multiscale networking protocol controls at least a first factor at a first timescale and at least a second factor at a second timescale, distinct from the first timescale, the local memory further storing instructions configured to determine a local deadline of a packet, and wherein the local deadline is derived using a link and path delay distribution;

the at least a first factor including at least one of an instantiated physical-ratio-K-(PRK) interference model for wireless transmissions and an instantiated directed, multi-hop data forwarding graph;

the at least a second factor including at least one of a channel assignment, a node transmission signal power control, a node transmission rate control, and a real-time scheduling control;

a local signal map stored in said local memory, wherein said local signal map, together with the instantiated physical-ratio-K (PRK) interference model, defines an interference relationship between a sensing and control node storing said local signal map and each other sensing and control node of said plurality of sensing and control nodes within an exclusion region of said sensing and control node storing said local signal map;

wherein the network is a multi-hop network; wherein the link and path delay distribution is based on a real-time scheduling policy including a process of adjusting a constant (K) parameter of a physical-ratio-K-scheduling (PRKS) protocol according to a first timescale and adjusting at least one of the channel assignment, the node transmission signal power and the node transmission rate according to a second timescale;

scheduling transmissions in the distributed sensing and control network based on interference relationships determined via the PRKS protocol such that no concurrent transmissions interfere with transmissions received at a receiving sensing and control node; and allocating time slots and channels to individual links at the second timescale, such that the scheduling and the channel assignment of each transmission ensure a desired link reliability and data delivery timeliness.

11. The distributed sensing and control network of claim 10, wherein a probabilistic path delay of the link and path delay distribution is at least partially based on network traffic statistics.

12. The distributed sensing and control network of claim 8, wherein the network is a cellular network with device to device (D2D) communications, and wherein each of said nodes further includes instructions configured to choose the operation mode (i.e., cellular or device to device) and to determine a local deadline of a packet, and wherein the local deadline is derived using information including at least a link and path delay distribution.

13. The distributed sensing and control network of claim 1, wherein the exclusion region is defined at least partially by at least one of a signal strength and a geometric length of the corresponding link to the node.

14. The distributed sensing and control network of claim 1, wherein at least one of said sensing and control nodes includes an actuator.

15. A multiscale method for controlling wireless transmissions in a distributed sensing and control network, comprising the steps of:
ensuring an instantaneous transmission reliability greater than a reliability threshold of a transmission jointly by adjusting a constant (K) parameter of a physical-ratio-K-scheduling (PRKS) protocol according to a first timescale and adjusting at least one of a channel assignment, a node transmission signal power and a node transmission rate according to a second timescale; and scheduling transmissions in the distributed sensing and control network based on interference relationships determined via the PRKS protocol such that no concurrent transmissions interfere with transmissions received at a receiving sensing and control node.

16. The multiscale method of claim 15, wherein a probability for the receiving sensing and control node to correctly receive a transmission from a sensing and control node at each time instant t is no less than a threshold value, wherein the threshold value is determined by a networked sensing and control application.

17. The multiscale method of claim 15, wherein adjusting the parameter K of the PRKS protocol according to the first timescale occurs on a timescale on the order of multiple packet transmissions.

18. The multiscale method of claim 15, wherein adjusting the at least one of the channel assignment, the node transmission signal power and the node transmission rate according to the second timescale occurs on a timescale on the order of a single packet transmission.

19. The multiscale method of claim 15, wherein adjusting the parameter K of the PRKS protocol comprises increasing the parameter K of the PRKS protocol in response to an instantaneous link reliability that is lower than an instantaneous required link reliability.

20. The multiscale method of claim 15, wherein adjusting the parameter K of the PRKS protocol comprises decreasing the parameter K of the PRKS protocol in response to an instantaneous link reliability that is higher than a required instantaneous link reliability.

21. A multiscale method for controlling wireless transmissions in a distributed sensing and control network, comprising the steps of:
ensuring an instantaneous transmission reliability of transmissions greater than a reliability threshold of a transmission by adjusting a constant (K) parameter of a physical-ratio-K-scheduling (PRKS) protocol according to a first timescale and adjusting at least one of a channel assignment, a node transmission signal power and a node transmission rate according to a second timescale;

scheduling network transmissions in the distributed sensing and control network based on interference relationships determined via the PRKS protocol such that no concurrent transmissions interfere with transmissions received at a receiving sensing and control node; and allocating time slots and channels to individual links at the second timescale, such that the scheduling and the channel assignment of each transmission ensure a desired link reliability and data delivery timeliness.

* * * * *